United States Patent
Kaneko

(10) Patent No.: US 10,741,903 B1
(45) Date of Patent: Aug. 11, 2020

(54) VEHICLE ANTENNA DEVICE

(71) Applicant: HARADA INDUSTRY CO., LTD., Tokyo (JP)

(72) Inventor: Kiyokazu Kaneko, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/635,531

(22) PCT Filed: Aug. 29, 2018

(86) PCT No.: PCT/JP2018/031860
§ 371 (c)(1),
(2) Date: Jan. 30, 2020

(87) PCT Pub. No.: WO2019/049739
PCT Pub. Date: Mar. 14, 2019

(30) Foreign Application Priority Data

Sep. 7, 2017 (JP) .................................. 2017-172009

(51) Int. Cl.
*H01Q 1/32* (2006.01)
*H01Q 1/22* (2006.01)
(Continued)

(52) U.S. Cl.
CPC ....... *H01Q 1/2283* (2013.01); *B60R 11/0205* (2013.01); *H01R 24/50* (2013.01);
(Continued)

(58) Field of Classification Search
CPC ... H01R 2201/02; H01R 2201/26; H01Q 1/32
(Continued)

(56) References Cited

U.S. PATENT DOCUMENTS 8,816,917 B2 * 8/2014 Ueno .................... H01Q 1/3275
343/713
9,653,788 B2 * 5/2017 Lerchner .............. H01Q 1/3275
(Continued)

FOREIGN PATENT DOCUMENTS

| EP | 1863119 A1 | 12/2007 |
| EP | 1903632 B1 | 1/2011 |

(Continued)

OTHER PUBLICATIONS

International Search Report in PCT/JP2018/031860 dated Oct. 30, 2018.

*Primary Examiner* — Dameon E Levi
*Assistant Examiner* — Hasan Z Islam
(74) *Attorney, Agent, or Firm* — Global IP Counselors, LLP

(57) ABSTRACT

A vehicle antenna device has a high noise-resistance performance even in high-frequency bands and capable of preventing breakage of a connector due to corotation at the time of fastening/fixing. The vehicle antenna device includes a vehicle exterior antenna and a vehicle interior antenna module. The vehicle interior antenna module includes a circuit board, a module side coaxial connector, a housing and a protecting fixing part. When the vehicle interior antenna module is fastened/fixed to the vehicle exterior antenna through a roof, the protecting fixing part slidably fixes the circuit board to the housing with pressing force that the circuit board is slid where force applied to the module side coaxial connector is larger than a predetermined force if the vehicle exterior antenna and the vehicle interior antenna module corotate due to the fastening and that the circuit board is not slid by vibration of the vehicle.

11 Claims, 6 Drawing Sheets

(51) Int. Cl.
    *B60R 11/02*     (2006.01)
    *H01R 24/50*     (2011.01)
    *B60R 11/00*     (2006.01)

(52) U.S. Cl.
    CPC . *B60R 2011/004* (2013.01); *B60R 2011/0028* (2013.01); *H01R 2201/02* (2013.01); *H01R 2201/26* (2013.01)

(58) Field of Classification Search
    USPC .................................................. 343/711–713
    See application file for complete search history.

(56) References Cited

U.S. PATENT DOCUMENTS

| | | |
|---|---|---|
| 10,186,762 B2 * | 1/2019 | Papp ...................... H01Q 1/283 |
| 2007/0279304 A1 | 12/2007 | Chakam et al. |
| 2014/0028507 A1 | 1/2014 | Mierke et al. |
| 2015/0065067 A1 | 3/2015 | Sugimoto et al. |
| 2015/0123854 A1 | 5/2015 | Chakam et al. |
| 2015/0270603 A1 | 9/2015 | Lee |

FOREIGN PATENT DOCUMENTS

| | | |
|---|---|---|
| JP | 2000182696 A | 6/2000 |
| JP | 2007096639 A | 4/2007 |
| JP | 2014514834 A | 6/2014 |
| JP | 2015046789 A | 3/2015 |
| JP | 2015516786 A | 6/2015 |
| KR | 20100041255 A | 4/2010 |
| WO | 2017001197 A1 | 1/2017 |

\* cited by examiner

VEHICLE ANTENNA DEVICE

CROSS-REFERENCE TO RELATED APPLICATIONS

This application is a U.S. national stage application of International Application No. PCT/JP2018/031860, filed on Aug. 29, 2018, and claims priority to Japanese Patent Application No. 2017-172009 filed on Sep. 7, 2017.

BACKGROUND

Technical Field

The present invention relates to a vehicle antenna device, and more particularly to a vehicle antenna device including a vehicle exterior antenna and a vehicle interior antenna module.

Background Information

As a vehicle antenna device, there is known a roof-mount antenna which is, for example, a low-profile vehicle exterior antenna fixed to the roof of a vehicle. A typical roof-mount antenna is connected to a vehicle interior antenna module through a coaxial connector cable or a relay cable. The vehicle interior antenna module is normally provided in a dashboard. The vehicle interior antenna module has an amplifier circuit and the like and performs various signal processing. The coaxial connector cable or the relay cable is routed from the roof to the dashboard to electrically connect the vehicle exterior antenna and the vehicle interior antenna module (see, for example, Japanese Patent Application Laid Open Publication No. 2015-046789).

Recently, in DSRC for V2X communication, a high-frequency band of 6 GHz, etc., is used, and thus highly reliable communication quality with less signal loss or less noise is required. When the above-mentioned relay cable is used, there may occur loss in a long cable, and, particularly in a vehicle antenna device, a cable is vibrated with vibration of the vehicle to generate noise.

To cope with the above problems, the vehicle exterior antenna and the vehicle interior antenna module are directly fastened/fixed to each other with the roof interposed therebetween. In present days, vehicle antenna devices need to support various wireless communications such as terrestrial or satellite radio, GNSS, mobile phone, and DSRC for V2X communication. Accordingly, the vehicle exterior antenna supports multi-bands, and the vehicle interior antenna module has various signal processors. Therefore, the vehicle interior antenna module becomes large and heavy. The vehicle antenna device handles signals of a plurality of frequency bands, so that a connector connecting the vehicle exterior antenna and the vehicle interior antenna module needs to have a plurality of terminals. Particularly, in high-frequency band communication such as DSRC, accuracy of a connector for signal transmission is very important. Allowance in connector fitting must be avoided since it may cause signal loss or noise. Thus, particularly, when a plurality of terminals are used, a high noise resistant connector produced with high fitting accuracy is required.

When the vehicle exterior antenna and the vehicle interior antenna module are directly fastened/fixed to each other with the roof interposed therebetween, an external load, such as vibration, applied to the large and heavy vehicle interior antenna module during vehicle traveling is increased, so that it is necessary to reliably fix the vehicle exterior antenna and the vehicle interior antenna module. In order to reliably fix the vehicle exterior antenna and the vehicle interior antenna module, a screw fastening method using a high fastening force is suitably employed because it is simple and effective. However, a friction force acting on a screw seat surface during the screw fastening causes corotation of the vehicle exterior antenna and vehicle interior antenna module, which may generate relative rotational displacement. In this case, when a connector produced with high fitting accuracy is used, the relative displacement of a connector fitting part cannot be structurally absorbed, which may cause cracking of a solder joint part or contact failure at a terminal part due to an external force caused by the rotational displacement. Meanwhile, there is known a connector having a floating structure capable of absorbing the positional displacement (see, for example, Japanese Patent Application Laid Open Publication No. 2000-182696).

SUMMARY

However, when a connector having the floating structure is used so as to prevent breakage of a connector due to corotation at direct fastening/fixing between the vehicle exterior antenna and the vehicle interior antenna module, structural complications may occur. Particularly, noise-resistance performance at a high-frequency band of, e.g., 6 GHz, is low, and signal loss in a moving part of a terminal may occur. A vehicle antenna device is always subject to vibration from a vehicle, so that when a connector having the floating structure is used, noise caused due to vibration cannot be avoided. Thus, it is difficult to apply a connector having the floating structure to a vehicle antenna device for DSRC.

In view of the above situation, the present invention has been made and the object thereof is to provide a vehicle antenna device having high noise-resistance performance even in high-frequency bands and capable of preventing breakage of a connector due to corotation at the time of fastening/fixing.

In order to achieve the above object of the present invention, a vehicle antenna device according to the present invention may comprise: a vehicle exterior antenna having an antenna base, an antenna element, and a vehicle exterior antenna side coaxial connector and disposed on a roof of a vehicle; and a vehicle interior antenna module fastened/fixed to the vehicle exterior antenna through the roof. The vehicle interior antenna module may include: a circuit board on which an amplifier circuit is placed; a module side coaxial connector having at least a terminal directed from inside the vehicle toward the vehicle exterior antenna, configured to be fitted to the vehicle exterior antenna side coaxial connector, and disposed on the circuit board in which the terminal extends vertically from inside the vehicle toward the vehicle exterior antenna; a housing in which the circuit board is housed; and a protecting fixing part for slidably fixing the circuit board to the housing, when the vehicle interior antenna module is fastened/fixed to the vehicle exterior antenna through the roof, with pressing force that the circuit board is slid where force applied to the module side coaxial connector is larger than a predetermined force if the vehicle exterior antenna and the vehicle interior antenna module corotate due to the fastening and that the circuit board is not slid by vibration of the vehicle.

The protecting fixing part may be constituted by an M-shaped plate spring, a center part of the M-shaped plate spring does not abut on the circuit board and is fastened/fixed to the housing through a hole formed in the circuit board, and both leg parts of the M-shaped plate spring abut on the circuit board to slidably fix the circuit board to the housing.

The protecting fixing part may have, between both shoulder parts of the M-shaped plate spring and the circuit board, an elastic body for preventing sudden sliding of the circuit board.

The protecting fixing part may be constituted by an inverted U-shaped plate spring, a center part of the inverted U-shaped plate spring does not abut on the circuit board and is fastened/fixed to the housing through a hole formed in the circuit board, and both leg parts of the inverted U-shaped plate spring abut on the circuit board to slidably fix the circuit board to the housing.

The protecting fixing part may be constituted by a washer with elastic body, a washer part of the washer with elastic body does not abut on the circuit board and is fastened/fixed to the housing through a hole formed in the circuit board, and an elastic body part of the washer with elastic body abuts on the circuit board to slidably fix the circuit board to the housing.

The protecting fixing part may be constituted by a projection washer, a washer part of the projection washer does not abut on the circuit board and is fastened/fixed to the housing through a hole formed in the circuit board, and a projection part of the projection washer abuts on the circuit board to slidably fix the circuit board to the housing.

The protecting fixing part may be constituted by a single tab washer, a washer part of the single tab washer does not abut on the circuit board and is fastened/fixed to the housing, and a single tab part of the single tab washer abuts on the circuit board to slidably fix the circuit board to the housing.

The protecting fixing part may have a positioning convex part for positioning the protecting fixing part, and the housing may have, at a side wall thereof, a positioning concave part in which the positioning convex part is fitted.

The housing may have a rotation preventing projection part for preventing rotation of the protecting fixing part.

The vehicle antenna device may further comprise a cover for covering an opening of the housing, wherein the cover may have a fixing convex part, and the protecting fixing part may have an engagement part engaged with the fixing convex part.

The antenna base of the vehicle exterior antenna may have a vehicle exterior antenna side connector protecting wall around the vehicle exterior antenna side coaxial connector, the housing of the vehicle interior antenna module may have a module side connector protecting wall around the module side coaxial connector, and when the vehicle interior antenna module is fastened/fixed to the vehicle exterior antenna through the roof, the vehicle exterior antenna side connector protecting wall and the module side connector protecting wall may be fitted to each other with a predetermined allowance therebetween so as to prevent the vehicle exterior antenna and the vehicle interior antenna module from corotating exceeding a predetermined degree.

The vehicle antenna device according to the present invention is advantageous in that it exhibits high noise resistance performance even in high-frequency bands and it can prevent breakage of the connector due to corotation at the time of fastening/fixing.

DETAILED DESCRIPTION OF THE EMBODIMENTS

Figure 1:
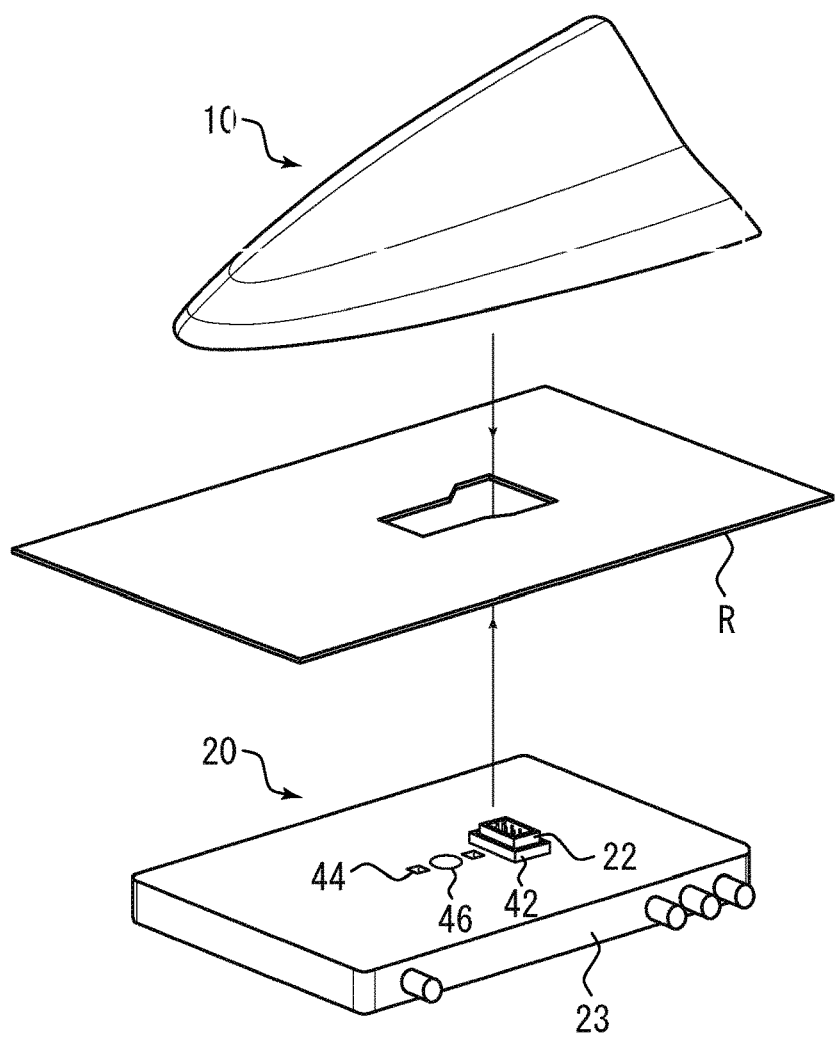
FIG. 1 is a schematic exploded perspective view for explaining the entire configuration of a vehicle antenna device according to the present invention.

Embodiments for practicing the present invention will be described below with reference to the accompanying drawings. FIG. 1 is a schematic exploded perspective view for explaining the entire configuration of a vehicle antenna device according to the present invention. As illustrated, the vehicle antenna device according to the present invention includes a vehicle exterior antenna 10 and a vehicle interior antenna module 20. The vehicle exterior antenna 10 and the vehicle interior antenna module 20 are fastened/fixed to each other through a vehicle roof R. The vehicle exterior antenna 10 and the vehicle interior antenna module 20 are fastened/fixed by screws or the like with the roof R sandwiched therebetween.

Figure 2:
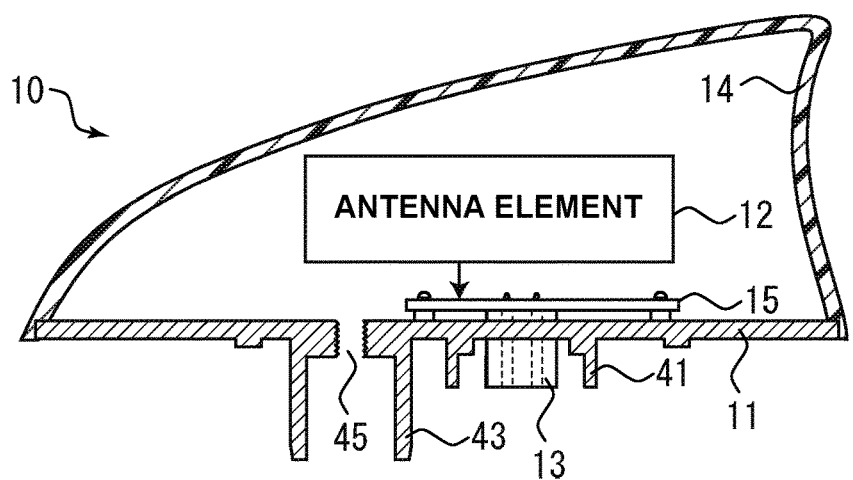
FIG. 2 is a schematic partial side cross-sectional view for explaining a vehicle exterior antenna of the vehicle antenna device according to the present invention.

The vehicle exterior antenna 10 is disposed on the vehicle roof R. For example, a low-profile antenna may be used as the vehicle exterior antenna 10. FIG. 2 illustrates an example of the vehicle exterior antenna 10. FIG. 2 is a schematic partial side cross-sectional view for explaining the vehicle exterior antenna of the vehicle antenna device according to the present invention. In FIG. 2, the same reference numerals as those in FIG. 1 denote the same parts as those in FIG. 1. As illustrated, the vehicle exterior antenna 10 includes an antenna base 11, an antenna element 12 and a vehicle exterior antenna side coaxial connector 13. The antenna base 11, the antenna element 12 and the vehicle exterior antenna side coaxial connector 13 are covered with an antenna cover 14. The antenna base 11 may be a conductive base, an insulating base or a composite base of a conductor and an insulator. The antenna element 12, which is schematically illustrated as a block in FIG. 2, may include various types of elements so as to support various wireless communications such as terrestrial or satellite radio, GNSS, mobile phone and DSRC for V2X communication. The vehicle exterior antenna side coaxial connector 13 is fitted to a module side coaxial connector 22 to be described later to connect signal lines. The vehicle exterior antenna side coaxial connector 13 may be constructed with high fitting accuracy so as to support high-frequency bands. For example, in the vehicle exterior antenna side coaxial connector 13 used in the vehicle antenna device according to the present invention, six coaxial terminals are disposed. In the vehicle antenna device according to the present invention, the number of the terminals of the vehicle exterior antenna side coaxial connector is not limited to the illustrated number, it is satisfied if there is at least one of them. Further, in the illustrated example, the vehicle exterior antenna side coaxial connector 13 is illustrated as a female connector. The vehicle exterior antenna side coaxial connector 13 may be fixed to the antenna base 11 or a substrate 15 of the vehicle exterior antenna 10 by soldering or screwing. The antenna cover 14 defines the outer shape of the vehicle exterior antenna and may have a so-called shark-fin shape, as illustrated. However, the present invention is not limited to this, and the antenna cover 14 may have any shape as long as it can house therein the antenna base 11, antenna element 12 and the like.

Figure 3A:
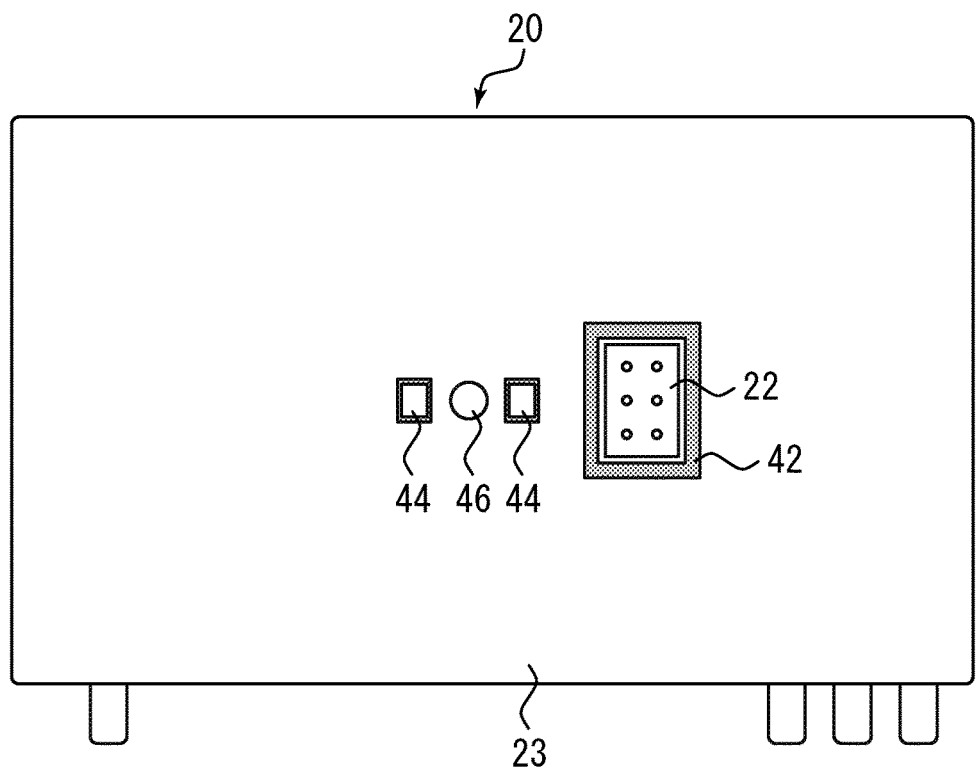
FIGS. 3A and 3B are schematic views for explaining a vehicle interior antenna module of the vehicle antenna device according to the present invention.
Figure 3B:
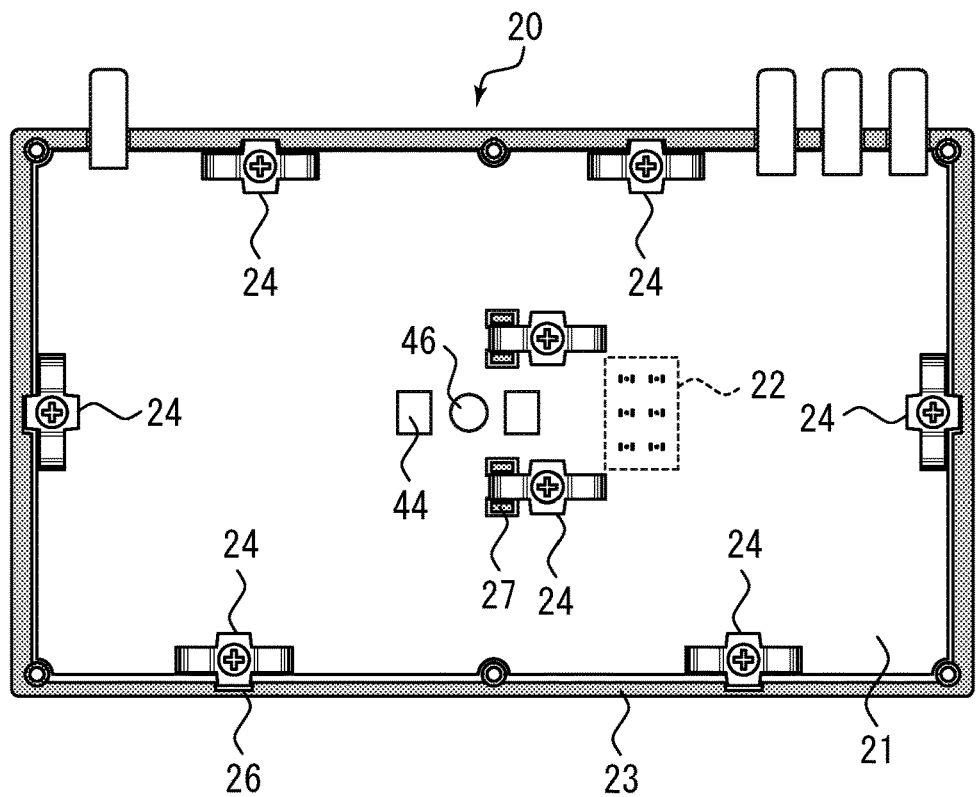

The vehicle interior antenna module 20 is fastened/fixed to the vehicle exterior antenna 10. The vehicle interior antenna module 20 is configured to process signals from the various antenna elements 12 corresponding to wireless communications such as terrestrial and satellite radios, GNSS, mobile phones, and DSRC for V2X communication. An example of the vehicle interior antenna module 20 is illustrated in FIGS. 3A and 3B. FIGS. 3A and 3B are schematic views for explaining the vehicle interior antenna module of the vehicle antenna device according to the present invention. FIG. 3A is a top view, and FIG. 3B is a bottom view. In the bottom view of FIG. 3B, a state where the housing is opened is shown. In these FIGS. 3A and 3B, the same reference numerals as those in FIG. 1 denote the same parts as those in FIG. 1. As illustrated, the vehicle interior antenna module 20 mainly includes a circuit board 21, a module side coaxial connector 22, a housing 23 and a protecting fixing part 24.

The circuit board 21 mainly includes an amplifier circuit placed thereon. A signal received by the vehicle exterior antenna 10 is amplified by the amplifier circuit and various signal processing is performed. Further, a power supply circuit and the like may be disposed on the circuit board 21.

The module side coaxial connector 22 is fitted to the vehicle exterior antenna side coaxial connector 13. The module side coaxial connector 22 has a plurality of terminals directed from inside the vehicle toward the vehicle exterior antenna 10. The module side coaxial connector 22 is disposed on the circuit board 21 in which the terminals extend vertically from inside the vehicle toward the vehicle exterior antenna 10. The module side coaxial connector 22 used in the vehicle antenna device according to the present invention has, e.g., six coaxial terminals. In the vehicle antenna device according to the present invention, the number of the terminals of the module side coaxial connector is not limited to the illustrated example; it is satisfied if there is at least a terminal. Further, in the illustrated example, the module side coaxial connector 22 is illustrated as a male connector. The module side coaxial connector 22 may be fixed to the circuit board 21 by soldering or screwing.

In the illustrated example, one pair of the vehicle exterior antenna side coaxial connector 13 and the module side coaxial connector 22 fitted thereto are provided; however, the present invention is not limited to this; a plurality of pairs of the vehicle exterior antenna side coaxial connector and the module side coaxial connector may be provided.

The housing 23 houses therein the circuit board 21. The housing 23 defines the outer shape of the vehicle interior antenna module 20. The inner shape of the housing 23 may be formed larger to some extent than the size of the circuit board 21 so as to allow the circuit board 21 to be moved in the housing 23. The housing 23 may be made of, e.g., a conductive material so as to serve as a ground for the circuit board 21. The opening formed on the back side of the housing 23 may be covered with, e.g., a resin cover.

The protecting fixing part 24 slidably fixes the circuit board 21 to the housing 23. When the vehicle interior antenna module 20 is fastened/fixed to the vehicle exterior antenna 10 through the roof R, the vehicle exterior antenna 10 and the vehicle interior antenna module 20 corotate due to the fastening. At this time, the protecting fixing part 24 may be configured to slidably fix the circuit board 21 to the housing 23 with pressing force that the circuit board 21 is slid where force applied to the module side coaxial connector 22 is larger than a predetermined force. That is, although the housing 23 corotates together with the vehicle exterior antenna 10 at the time of fastening/fixing, the circuit board 21 housed in the housing 23 is slid such that the module side coaxial connector 22 is not moved while being fitted to the vehicle exterior antenna side coaxial connector 13. This makes it possible to maintain a connection state of the high noise-resistant coaxial terminals produced with high fitting accuracy while preventing breakage of the connector.

Further, the pressing force of the protecting fixing part 24 may be pressing force that the circuit board 21 is not slid by vibration of vehicle. After the vehicle exterior antenna 10 and the vehicle interior antenna module 20 are fastened/fixed to each other, the vehicle antenna device is subject to vehicle vibration, but since the vehicle exterior antenna 10 and the vehicle interior antenna module 20 are integrated with each other, only the circuit board 21 needs to be fixed so as not to be slid by the vibration. Thus, a set load (pressing force) against the protecting fixing part 24 may be designed so as to be larger than the force brought about by vehicle vibration and smaller than the force brought about at the time of fastening/fixing. As described above, the protecting fixing part 24 can protect the connector against breakage at the time of fastening/fixing and, at the same time, can reliably fix the circuit board 21 to the housing 23 after the fastening/fixing.

Figure 4A:
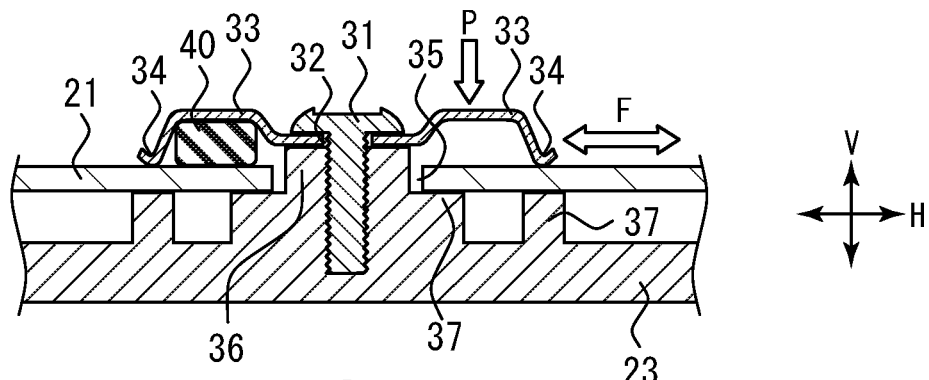
FIGS. 4A and 4B are schematic views for explaining a protecting fixing part used in the vehicle interior antenna module of the vehicle antenna device according to the present invention.
Figure 4B:
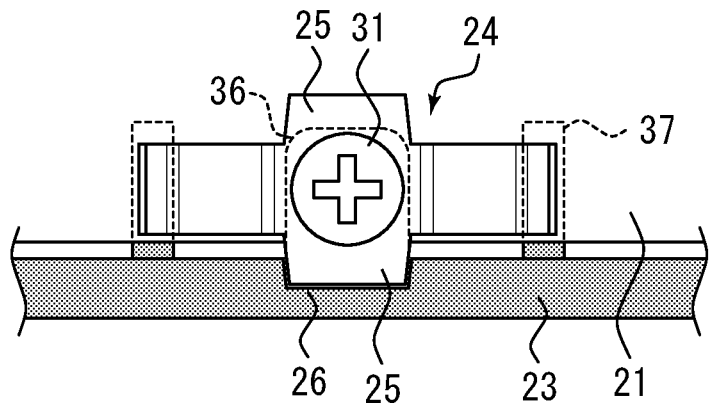

Hereinafter, using FIGS. 4A and 4B, the protecting fixing part 24 will be described in more detail. FIGS. 4A and 4B are schematic views for explaining the protecting fixing part used in the vehicle interior antenna module of the vehicle antenna device according to the present invention. FIG. 4A is a side view, and FIG. 4B is a top view. In FIGS. 4A and 4B, the same reference numerals as those in FIGS. 3A and 3B denote the same parts as those in FIGS. 3A and 3B. As illustrated, the protecting fixing part 24 may be, e.g., an M-shaped plate spring. Specifically, a plate-like member may be subjected to sheet metal processing such that it has a M-shape as viewed from the side. The M-shape refers to a shape having shoulder parts 33 and leg parts 34. The shoulder parts 33 are formed at the respective left and right sides centering on a screw through hole 32 through which a screw 31 penetrates at fixing. The leg parts 34 extend respectively from both shoulder parts 33 and press the circuit board 21. More specifically, the protecting fixing part 24 is fastened/fixed by the screw 31 to the housing 23 through a hole 35 formed in the circuit board 21 while a portion adjacent to the screw through hole 32 at the center of the M-shaped plate spring is not abutting on the circuit board 21. On the other hand, the both leg parts 34 of the M-shaped plate spring of the protecting fixing part 24 abut on the circuit board 21 to thereby slidably fix the circuit board 21 to the housing 23.

The circuit board 21 is not directly fixed to the housing 23, but housed in the housing 23 in a slidable state. More specifically, the circuit board 21 is housed in the housing 23 such that it is slid in the planar direction thereof but not moved in a direction perpendicular to the planar direction. A screw hole into which the screw 31 for fixing the protecting fixing part 24 is screwed is formed in a screw boss 36. The hole 35 of the circuit board 21 is larger in diameter than the screw boss 36, and the screw boss 36 penetrates the hole 35. A pedestal part 37 on which the circuit board 21 abuts is formed around the screw boss 36. In the protecting fixing part 24, only the leg parts 34 of the M-shaped plate spring abut on the circuit board 21. Further, the pedestal part 37 is also formed on the back side of a position at which the leg part 34 abuts on the circuit board 21 so as to abut on the circuit board 21. That is, the circuit board 21 is sandwiched between the leg parts 34 and the pedestal parts 37. With such a configuration, the axial force of the screw 31 is prevented from directly acting on the circuit board 21. This eliminates the need to manage the holding force of the circuit board 21 by the fastening torque of the screw 31 at the time of assembly. The holding force of the circuit board 21 may be managed by the pressing force of the spring of the protecting fixing part 24. This improves workability when the circuit board 21 is assembled to the housing 23.

As described above, the protecting fixing part 24 presses the circuit board 21 against the pedestal parts 37 of the housing 23 to hold the circuit board 21. Referring to FIG. 4A, a set load against the spring corresponds to a pressing force P in a spring working direction V. Further, in a direction H which is the planar direction of the circuit board 21 and is perpendicular to the spring working direction V, a friction force F between the circuit board 21 and the pedestal parts 37 and that between the circuit board 21 and the leg parts 34, which are generated by the spring pressing force P, correspond to the holding force of the circuit board 21. Thus, the spring pressing force P is set based on friction coefficients between the circuit board 21 and the pedestal part 37 and between the circuit board 21 and the leg part 34 so as to fall within a range of not less than the maximum value of external force acting on the vehicle interior antenna module 20 and not more than a value at which a joint part between the connector and the circuit board is not affected while the fitting accuracy and the connection state of the connector are maintained.

When the circuit board 21 is slid against the holding force (friction force F), the friction coefficient changes from a positive friction coefficient to a dynamic friction coefficient, with the result that the friction force may suddenly drop depending on the characteristic of the friction surface of a member on which the circuit board 21 abuts. Thus, in order to prevent sudden sliding of the circuit board, an elastic body 40 may be interposed between both of the shoulder parts 33 of the M-shaped plate spring of the protecting fixing part 24 and the circuit board 21. That is, deformation resistance of the elastic body 40 allows relaxation of sudden motion, thereby preventing the sudden sliding of the circuit board 21. The elastic body 40 may be, e.g., elastomer. Further, the elastic body 40 may have a heat radiation property. Although the elastic body 40 is provided at one shoulder part 33 in the illustrated example, the present invention is not limited to this; the elastic bodies 40 may be provided at both the shoulder parts 33, respectively.

As illustrated in FIG. 4B, the protecting fixing part 24 may have a positioning convex part 25 for positioning the protecting fixing part 24 itself. Correspondingly, the housing 23 may have, in the side wall thereof, a positioning concave part 26 in which the positioning convex part 25 is fitted. This facilitates the positioning of the protecting fixing part 24 when the circuit board 21 is assembled to the housing 23. Further, fitting between the positioning convex part 25 and the positioning concave part 26 prevents corotation of the protecting fixing part 24 when the screw 31 is fastened.

Referring back to FIG. 3B, the housing 23 may have a rotation preventing projection part 27 for preventing rotation of the protecting fixing part 24. When the protecting fixing part 24 is positioned at the peripheral edge of the circuit board 21, it may be fitted in the positioning concave part 26 formed in the side wall of the housing 23; however, the protecting fixing part 24 may be positioned at the center part of the circuit board 21. In this case, the rotation preventing projection part 27 is provided so as to sandwich the shoulder part 33 or leg part 34 of the protecting fixing part 24, whereby it is possible to prevent rotation of the protecting fixing part 24. The rotation preventing projection part 27 is provided in the housing 23 so as to be exposed from the surface of the circuit board 21 through a cut or a hole formed in the circuit board 21.

Further, the protecting fixing part 24 may be made of a conductive material. The ground pattern of the circuit board 21 is disposed so as to align the abutting position with respect to the protecting fixing part 24 and can thereby be reliably grounded on the housing 23 made of a conductive material.

Figure 5:
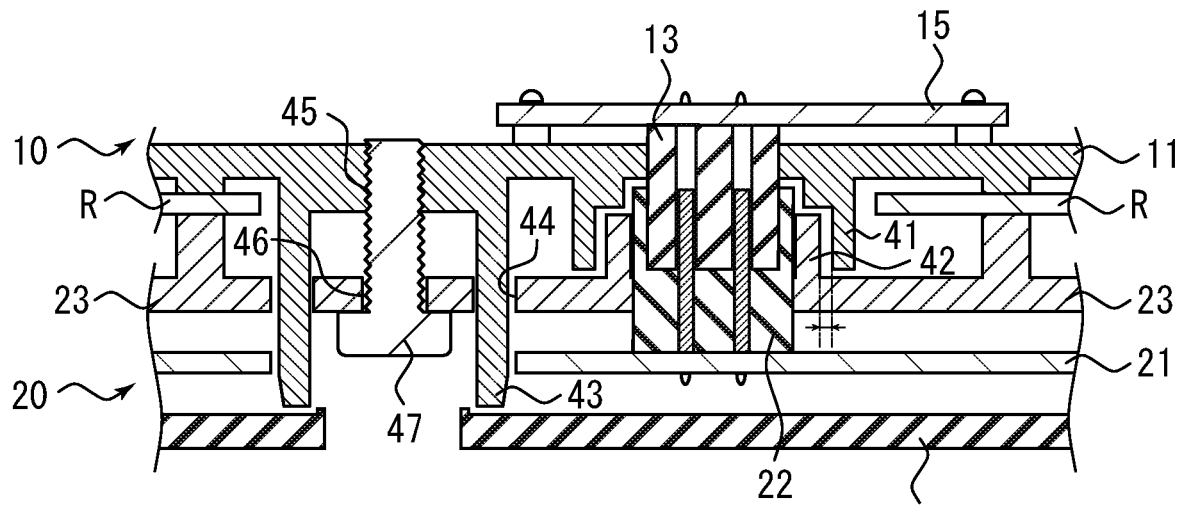
FIG. 5 is a schematic enlarged cross-sectional view for explaining a connector connecting part in the vehicle antenna device according to the present invention.

Hereinafter, using FIG. 5, the structure of a connector connecting part will be described in more detail. FIG. 5 is a schematic enlarged cross-sectional view for explaining the connector connecting part in the vehicle antenna device according to the present invention. In FIG. 5, the same reference numerals as those in FIGS. 1 to 4A and 4B denote the same parts as those in FIGS. 1 to 4A and 4B. The illustrated example shows a state where the vehicle exterior antenna 10 and the vehicle interior antenna module 20 of the vehicle antenna device according to the present invention are fastened/fixed to each other through the vehicle roof R. The antenna base 11 of the vehicle exterior antenna 10 has, around the vehicle exterior antenna side coaxial connector 13, a vehicle exterior antenna side connector protecting wall 41. The housing 23 of the vehicle interior antenna module 20 has, around the module side coaxial connector 22, a module side connector protecting wall 42. In the illustrated example, the module side connector protecting wall 42 is provided so as to cover the peripheral portion of the module side coaxial connector 22 solder-fixed to the circuit board 21 with no gap. The vehicle exterior antenna side connector protecting wall 41 is provided so as to cover the outer circumference of the module side connector protecting wall 42. The vehicle exterior antenna side connector protecting wall 41 and the module side connector protecting wall 42 are fitted to each other with a predetermined allowance (slight gap) therebetween. With such a configuration, it is possible to prevent the vehicle exterior antenna 10 and the vehicle interior antenna module 20 from corotating in excess of a predetermined degree when the vehicle interior antenna module 20 is fastened/fixed to the vehicle exterior antenna 10 through the roof R. That is, even when there is a possibility that the vehicle exterior antenna 10 and the vehicle interior antenna module 20 corotate in excess of the predetermined degree due to application of a large load, the vehicle exterior antenna side connector protecting wall 41 and the module side connector protecting wall 42 abut on each other. Thus, the large load can be received in this state, thereby preventing the circuit board 21 from being slid more than necessary.

Further, since the connector connecting part is surrounded by the vehicle exterior antenna side connector protecting wall 41 and the module side connector protecting wall 42, the shield effect for the connecting part can be enhanced.

The antenna base 11 of the vehicle exterior antenna 10 has a connecting guide bar 43 and, correspondingly, the housing 23 of the vehicle interior antenna module 20 has a connecting guide hole 44 through which the connecting guide bar 43 penetrates. A fastening/fixing screw hole 45 is formed between two connecting guide bars 43, and the vehicle exterior antenna 10 and the vehicle interior antenna module 20 are fastened/fixed to each other by a fastening/fixing screw 47 screwed into a fastening hole 46 formed between the two connecting guide holes 44.

Further, as illustrated, the back side opening of the vehicle interior antenna module 20 according to the present invention may be covered with a cover 48. The cover 48 may be made of a conductive material or a resin material. From a view point of weight reduction, a resin cover is preferable.

Figure 6A:
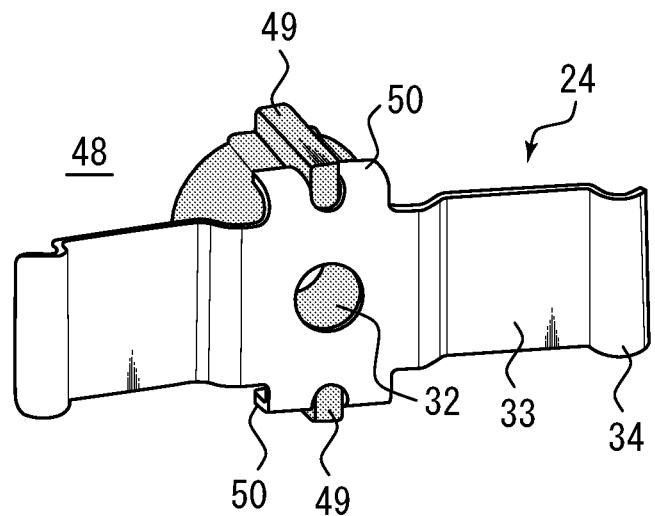
FIGS. 6A and 6B are schematic views for explaining another example of the protecting fixing part used in the vehicle interior antenna module of the vehicle antenna device according to the present invention.
Figure 6B:
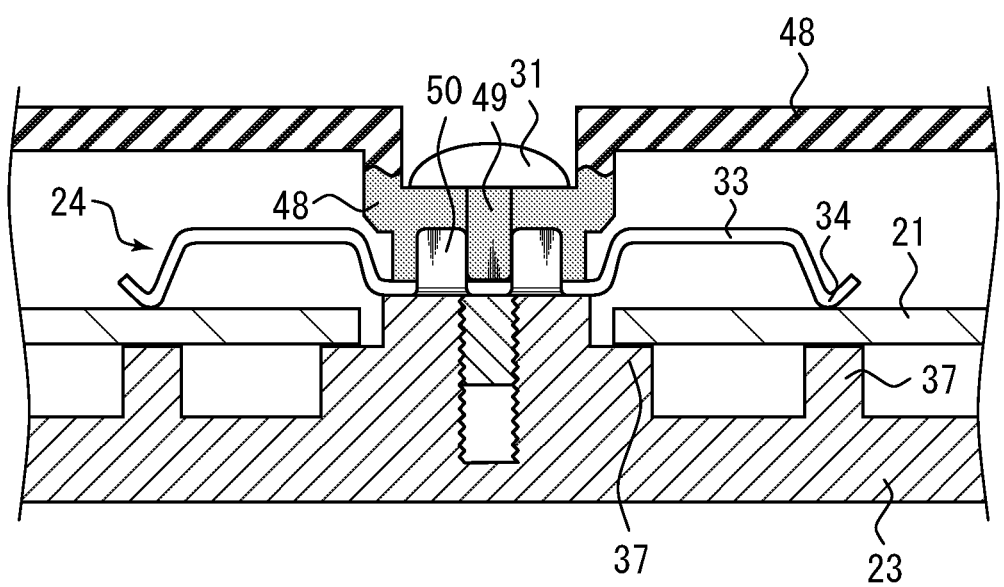

Hereinafter, another example of the protecting fixing part used in the vehicle interior antenna module of the vehicle antenna device according to the present invention will be described using FIGS. 6A and 6B. FIGS. 6A and 6B are schematic views for explaining another example of the protecting fixing part used in the vehicle interior antenna module of the vehicle antenna device according to the present invention. FIG. 6A is a perspective view, and FIG. 6A is a partial cross-sectional view. In FIGS. 6A and 6B, the same reference numerals as those in FIGS. 4A and 4B denote the same parts as those in FIGS. 4A and 4B. The protecting fixing part 24 in the illustrated example has an engagement part 50 engaged with a fixing convex part 49 formed in the cover 48 covering the opening of the housing 23. The engagement part 50 may be formed by bending a plate-like member toward the cover 48 side through sheet metal processing. Specifically, the engagement part 50 is constituted of two left-side tabs and two right-side tabs, and the protecting fixing part 24 is temporarily fixed to the cover 48 with the left and right fixing convex parts 49 sandwiched between the tabs. Then, the screw 31 is used to fix the protecting fixing part 24 to the housing 23 together with the cover 48. In this example, using the fixing convex part 49 and engagement part 50 achieves positioning and rotation prevention of the protecting fixing part 24. In the illustrated example, one fixing convex part 49 is sandwiched between the two tabs of the engagement part 50; however, the present invention is not limited to this. For example, the protecting fixing part 24 may be temporarily fixed to the cover 48 with one tab of the engagement part 50 sandwiched between two fixing convex parts (or fixing concave parts). In the thus configured vehicle antenna device according to the present invention, it is possible to temporarily fix the protecting fixing part 24 to the cover 48 covering the opening of the housing 23, so that workability at the time of assembly is further improved.

Hereinafter, other examples of the protecting fixing part used in the vehicle interior antenna module of the vehicle antenna device according to the present invention will be described using FIGS. 7A to 7D. FIGS. 7A to 7D are schematic cross-sectional views for explaining other examples of the protecting fixing part used in the vehicle interior antenna module of the vehicle antenna device according to the present invention. FIGS. 7A to 7D illustrate variations of the protecting fixing part 24, respectively. In FIGS. 7A to 7D, the same reference numerals as those in FIG. 4 denote the same parts as those in FIGS. 4A and 4B.

Figure 7A:
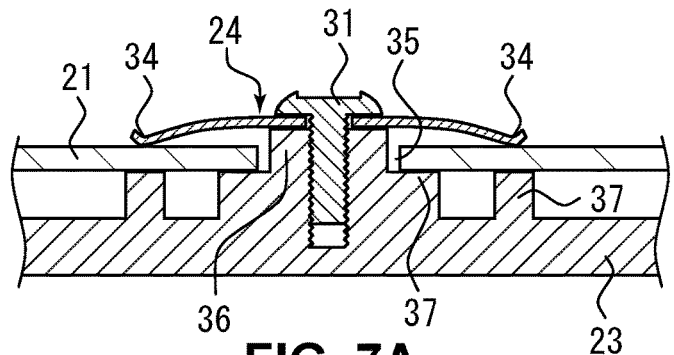
FIGS. 7A to 7D are schematic cross-sectional views for explaining other examples of the protecting fixing part used in the vehicle interior antenna module of the vehicle antenna device according to the present invention.

In the example of FIG. 7A, the protecting fixing part 24 is constituted by an inverted U-shaped plate spring. The center part of the inverted U-shaped spring does not abut on the circuit board 21 but is fastened/fixed to the housing 23, specifically, the screw boss 36 of the housing 23 through the hole 35 formed in the circuit board 21. On the other hand, both leg parts 34 of the inverted U-shaped plate spring abut on the circuit board 21 to thereby slidably fix the circuit board 21 to the housing 23. The pedestal part 37 is formed on the back side of a position at which the leg part 34 abuts on the circuit board 21. The pressing force of the inverted U-shaped spring may be designed so as to be larger than the force brought about by vehicle vibration and smaller than the force brought about at the time of fastening/fixing.

Figure 7B:
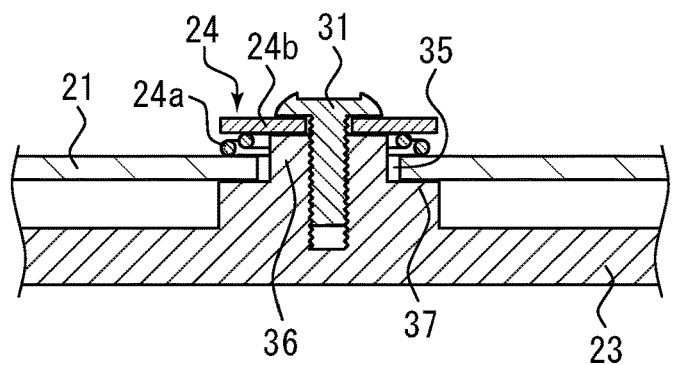

In the example of FIG. 7B, the protecting fixing part 24 is constituted by a washer with elastic body. An elastic body part 24a of the washer with elastic body may be, e.g., a helical spring as illustrated, or a ring-shaped rubber body. A washer part 24b of the washer with elastic body does not abut on the circuit board 21 but is fastened/fixed to the housing 23 through the hole 35 formed in the circuit board 21. On the other hand, the elastic body part 24a of the washer with elastic body abuts on the circuit board 21 to thereby slidably fix the circuit board 21 to the housing 23. A constant distance is kept between the washer part 24b and the circuit board 21, so that the pressing force of the elastic body part 24a disposed between the washer part 24b and the circuit board 21 may be designed so as to be larger than the force brought about by vehicle vibration and smaller than the force brought about at the time of fastening/fixing.

Figure 7C:
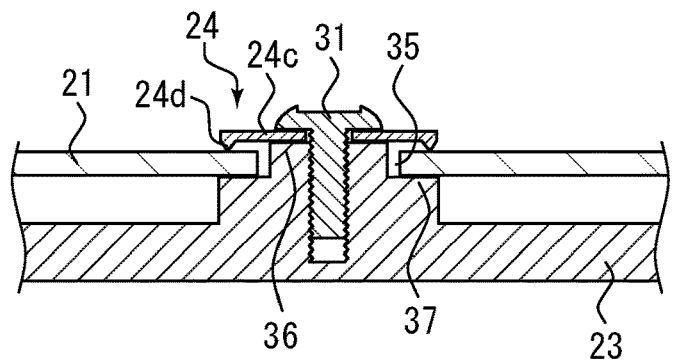

In the example of FIG. 7C, the protecting fixing part 24 is constituted by a projection washer. A washer part 24c of the projection washer does not abut on the circuit board 21 but is fastened/fixed to the housing 23 through the hole 35 formed in the circuit board 21. On the other hand, a projection part 24d of the projection washer abuts on the circuit board 21 to thereby slidably fix the circuit board 21 to the housing 23. The pressing force of the washer part 24c functioning as an elastic body may be designed so as to be larger than the force brought about by vehicle vibration and smaller than force brought about at the time of fastening/fixing.

Figure 7D:
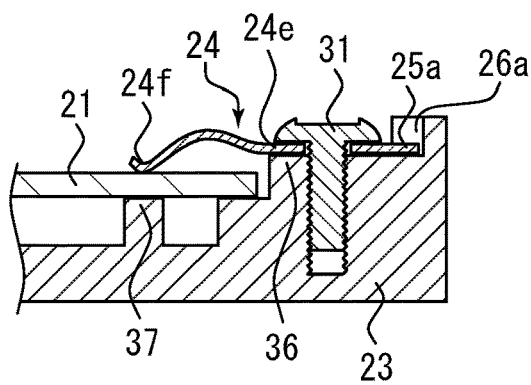

In the example of FIG. 7D, the protecting fixing part 24 is constituted by a single tab washer. In this configuration, the protecting fixing part 24 is fastened/fixed by the screw 31 to, e.g., the outside of the peripheral edge of the circuit board 21. A washer part 24e of the single tab washer does not abut on the circuit board 21, but is fastened/fixed to the housing 23. On the other hand, a single tab part 24f of the single tab washer abuts on the circuit board 21 to thereby slidably fix the circuit board 21 to the housing 23. As illustrated, the single tab part 24f is formed as an inverted U-shape and the pressing force of the single tab part 24f may be designed so as to be larger than the force brought about by vehicle vibration and smaller than the force brought about at the time of fastening/fixing. A positioning convex part 25a for positioning the washer part 24e of the single tab washer may be formed on the side opposite to a position at which the single tab part 24f of the single tab washer is positioned. The positioning convex part 25a is configured to be fitted in a positioning concave part 26a formed in the side wall of the housing 23. This facilitates positioning of the protecting fixing part 24 when the circuit board 21 is assembled to the housing 23.

Figure 8A:
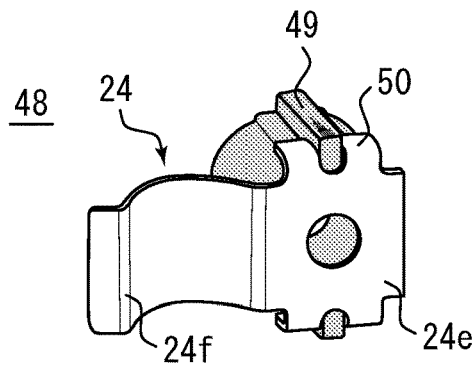
FIGS. 8A and 8B are schematic views for explaining another example of a configuration in which the protecting fixing part used in the vehicle interior antenna module of the vehicle antenna device according to the present invention is temporarily fixed to a cover.
Figure 8B:
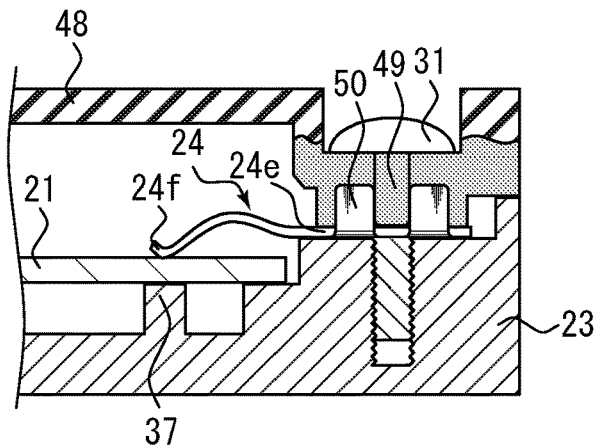

Hereinafter, another example of a configuration in which the protecting fixing part used in the vehicle interior antenna module of the vehicle antenna device according to the present invention is temporarily fixed to the cover will be described using FIGS. 8A and 8B. FIGS. 8A and 8B are schematic views for explaining another example of a configuration in which the protecting fixing part used in the vehicle interior antenna module of the vehicle antenna device according to the present invention is temporarily fixed to the cover. FIG. 8A is a perspective view of the protecting fixing part, and FIG. 8B is a partial cross-sectional view illustrating an assembled state thereof. In FIGS. 8A and 8B, the same reference numerals as those in FIGS. 6A and 6B denote the same parts as those in FIGS. 6A and 6B. The illustrated example is a modification of the protecting fixing part 24 in which the protecting fixing part 24 is constituted by the single tab washer as illustrated in FIG. 7B. Further, this is an example as illustrated in FIGS. 6A and 6B in which the protecting fixing part 24 can be temporarily fixed to the cover 48 covering the opening of the housing 23. As illustrated, the protecting fixing part 24 is temporarily fixed to the cover 48 covering the opening of the housing 23. Specifically, the protecting fixing part 24 has the engagement part 50 engaged with the fixing convex part 49 formed in the cover 48 covering the opening of the housing 23. The engagement part 50 may be formed by bending a plate-like member toward the cover 48 side through sheet metal processing. Specifically, the engagement part 50 is constituted of two left-side tabs and two right-side tabs, and the protecting fixing part 24 is temporarily fixed to the cover 48 with the left and right fixing convex parts 49 sandwiched between the tabs. Then, the screw 31 is used to fix the protecting fixing part 24 to the housing 23 together with the cover 48. In this example, using the fixing convex part 49 and engagement part 50 achieves positioning and rotation prevention of the protecting fixing part 24. The washer part 24e of the single tab washer constituting the protecting fixing part 24 does not abut on the circuit board 21, but is fastened/fixed to the housing 23. On the other hand, the single tab part 24f of the single tab washer abuts on the circuit board 21 to thereby slidably fix the circuit board 21 to the housing 23. The pressing force of the inverted U-shaped single tab part 24f may be designed so as to be larger than the force brought about by vehicle vibration and smaller than the force brought about at the time of fastening/fixing.

Figure 9A:
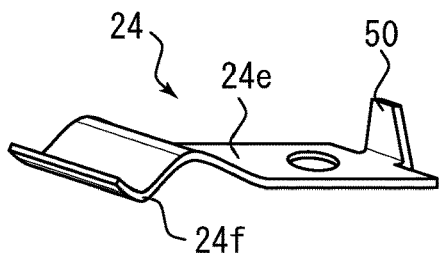
FIGS. 9A and 9B are schematic views for explaining still another example of a configuration in which the protecting fixing part used in the vehicle interior antenna module of the vehicle antenna device according to the present invention is temporarily fixed to the cover.
Figure 9B:
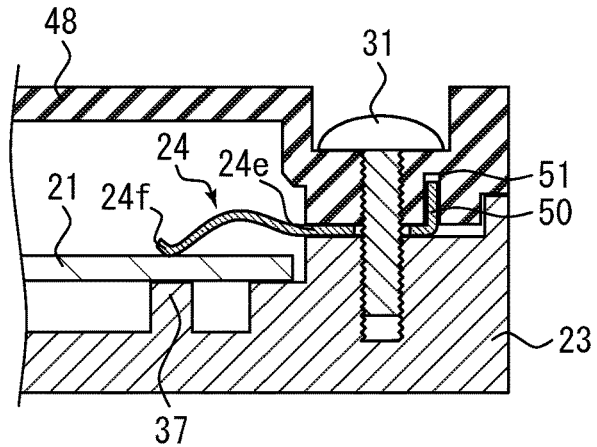

Although the fixing convex part 49 protrudes from the side surface of the screw boss of the cover 48 in the above example, the present invention is not limited to this. That is, the engagement part 50 may be fitted in an engagement hole formed in the cover 48. FIGS. 9A and 9B are schematic views for explaining still another example of a configuration in which the protecting fixing part used in the vehicle interior antenna module of the vehicle antenna device according to the present invention is temporarily fixed to the cover. FIG. 9A is a perspective view of the protecting fixing part, and FIG. 9B is a partial cross-sectional view illustrating an assembled state thereof. In FIGS. 9A and 9B, the same reference numerals as those in FIGS. 8A and 8B denote the same parts as those in FIGS. 8A and 8B. In this example, the engagement part 50 is fitted in an engagement hole 51 formed in the cover 48. The engagement part 50 may be formed by bending a plate-like member toward the cover 48 side through sheet metal processing. Specifically, the engagement part 50 is constituted by one tab formed by bending the end portion of the short side of the protecting fixing part 24. The cover 48 has the engagement hole 51 formed therein, and the engagement part 50 is fitted in the engagement hole 51 to temporarily fix the protecting fixing part 24 to the cover 48. Although the engagement part 50 is constituted by one tab in the illustrated example, the present invention is not limited to this; a plurality of tabs may be provided, and a plurality of engagement holes corresponding to the plurality of tabs may be formed in the cover 48.

The protecting fixing part of the vehicle antenna device according to the present invention is thus configured, whereby it is possible to manage pressing force against the circuit board by the pressing force of the plate spring of the protecting fixing part without the need for considering the fastening torque of the screw when the circuit board is fixed to the housing.

As described above, the vehicle antenna device of the present invention can take maximum advantage of the performance of the high noise resistant connector produced with high fitting accuracy and thus exhibits high noise-resistance performance even in high-frequency bands. Even when a load is applied to the connector due to corotation at the time of fastening/fixing, application of a load equal to or higher than a predetermined level causes the circuit to be slid to thereby prevent breakage of the connector. Further, after fastening/fixing, the circuit board is not slid even when the vehicle antenna device is subject to vehicle vibration, preventing connector performance and function from being impaired.

The vehicle antenna device according to the present invention is not limited to the above illustrative examples but may be variously modified without departing from the scope of the present invention.

The invention claimed is:

1. A vehicle antenna device comprising:
 a vehicle exterior antenna having an antenna base, an antenna element, and a vehicle exterior antenna side coaxial connector and disposed on a roof of a vehicle; and
 a vehicle interior antenna module fastened/fixed to the vehicle exterior antenna through the roof,
 the vehicle interior antenna module including:
  a circuit board on which an amplifier circuit is placed;
  a module side coaxial connector having at least a terminal directed from inside the vehicle toward the vehicle exterior antenna, configured to be fitted to the vehicle exterior antenna side coaxial connector, and disposed on the circuit board in which the terminal extends vertically from inside the vehicle toward the vehicle exterior antenna;
  a housing in which the circuit board is housed; and
  a protecting fixing part for slidably fixing the circuit board to the housing, when the vehicle interior antenna module is fastened/fixed to the vehicle exterior antenna through the roof, with pressing force that the circuit board is slid where force applied to the module side coaxial connector is larger than a predetermined force if the vehicle exterior antenna and the vehicle interior antenna module corotate due to the fastening and that the circuit board is not slid by vibration of the vehicle.

2. The vehicle antenna device according to claim 1, wherein
 the protecting fixing part is constituted by an M-shaped plate spring, a center part of the M-shaped plate spring does not abut on the circuit board and is fastened/fixed to the housing through a hole formed in the circuit board, and both leg parts of the M-shaped plate spring abut on the circuit board to slidably fix the circuit board to the housing.

3. The vehicle antenna device according to claim 2, wherein the protecting fixing part has, between both shoulder parts of the M-shaped plate spring and the circuit board, an elastic body for preventing sudden sliding of the circuit board.

4. The vehicle antenna device according to claim 1, wherein the protecting fixing part is constituted by an inverted U-shaped plate spring, a center part of the inverted U-shaped plate spring does not abut on the circuit board and is fastened/fixed to the housing through a hole formed in the circuit board, and both leg parts of the inverted U-shaped plate spring abut on the circuit board to slidably fix the circuit board to the housing.

5. The vehicle antenna device according to claim 1, wherein the protecting fixing part is constituted by a washer with elastic body, a washer part of the washer with elastic body does not abut on the circuit board and is fastened/fixed to the housing through a hole formed in the circuit board, and an elastic body part of the washer with elastic body abuts on the circuit board to slidably fix the circuit board to the housing.

6. The vehicle antenna device according to claim 1, wherein the protecting fixing part is constituted by a projection washer, a washer part of the projection washer does not abut on the circuit board and is fastened/fixed to the housing through a hole formed in the circuit board, and a projection part of the projection washer abuts on the circuit board to slidably fix the circuit board to the housing.

7. The vehicle antenna device according to claim 1, wherein the protecting fixing part is constituted by a single tab washer, a washer part of the single tab washer does not abut on the circuit board and is fastened/fixed to the housing, and a single tab part of the single tab washer abuts on the circuit board to slidably fix the circuit board to the housing.

8. The vehicle antenna device according to claim 1, wherein the protecting fixing part has a positioning convex part for positioning the protecting fixing part, and the housing has, at a side wall thereof, a positioning concave part in which the positioning convex part is fitted.

9. The vehicle antenna device according to claim 1, wherein the housing has a rotation preventing projection part for preventing rotation of the protecting fixing part.

10. The vehicle antenna device according to claim 1, further comprising a cover for covering an opening of the housing, wherein the cover has a fixing convex part, and the protecting fixing part has an engagement part engaged with the fixing convex part.

11. The vehicle antenna device according to claim 1, wherein the antenna base of the vehicle exterior antenna has a vehicle exterior antenna side connector protecting wall around the vehicle exterior antenna side coaxial connector, the housing of the vehicle interior antenna module has a module side connector protecting wall around the module side coaxial connector, and when the vehicle interior antenna module is fastened/fixed to the vehicle exterior antenna through the roof, the vehicle exterior antenna side connector protecting wall and the module side connector protecting wall are fitted to each other with a predetermined allowance therebetween so as to prevent the vehicle exterior antenna and the vehicle interior antenna module from corotating exceeding a predetermined degree.

* * * * *